(12) United States Patent
Sensui

(10) Patent No.: US 6,384,987 B1
(45) Date of Patent: May 7, 2002

(54) WIDE-ANGLE LENS SYSTEM

(75) Inventor: Takayuki Sensui, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/501,681

(22) Filed: Feb. 10, 2000

(30) Foreign Application Priority Data

Feb. 15, 1999 (JP) .......................................... 11-036100

(51) Int. Cl.$^7$ ............................ G02B 13/04; G02B 9/04
(52) U.S. Cl. ........................ 359/753; 359/749; 359/793
(58) Field of Search ................................. 359/753, 754, 359/755, 756, 793

(56) References Cited

U.S. PATENT DOCUMENTS 4,950,055 A     8/1990  Tatsuno ..................... 350/462
5,724,193 A     3/1998  Hirakawa ................... 359/691
5,805,359 A  *  9/1998  Yamanashi .................. 359/753
5,828,498 A  * 10/1998  Sekiya et al. ............... 359/660

* cited by examiner

*Primary Examiner*—Jordan Schwartz
*Assistant Examiner*—Tim Thompson
(74) *Attorney, Agent, or Firm*—Greenblum & Bernstein, P.L.C.

(57) ABSTRACT

A wide-angle lens system includes a negative first lens group, and a positive second lens group with a diaphragm, in this order from the object. The wide-angle lens system satisfies the following condition:

$-1.4 < f1/f < -1.1$  (1)

wherein f1 designates the focal length of the first lens group, and f designates the focal length of the entire lens system.

19 Claims, 11 Drawing Sheets

WIDE-ANGLE LENS SYSTEM

BACKGROUND OF THE INVENTION

1. Field of the Invention

The present invention relates to a retrofocus wide-angle lens system to be used in a single lens reflex camera.

2. Description of the Related Art

In a single lens reflex camera, in order to maintain a sufficient back focal distance, a retrofocus lens system, in which negative front lens group (the first lens group) and a positive rear lens group (the second lens group) are provided in this order from the object, has been widely used as a wide-angle lens system. In particular, in a conventional retrofocus wide-angle lens system having the half angle of view of about 32° to 36°, if an attempt is made to miniaturize the lens system, the optical performance thereof is deteriorated, so that miniaturization of the lens system is not sufficiently attained.

SUMMARY OF THE INVENTION

It is an object of the present invention to provide a miniaturized retrofocus wide-angle lens system in which the half angle of view is about 32°. Furthermore, it is another object of the present invention to provide a miniaturized wide-angle lens system which has a high optical performance.

In order to achieve the above mentioned objects, there is provided a wide-angle lens system including a negative first lens group, and a positive second lens group on which a diaphragm is mounted, in this order from the object. The wide-angle lens system satisfies the following condition:

$$-1.4 < f1/f < -1.1 \tag{1}$$

wherein f1 designates the focal length of the first lens group, and f designates the focal length of the entire lens system.

As defined in condition (1), if the negative power of the first lens group is made stronger, miniaturization can be attained.

In order to correct aberrations occurred in the negative first lens group, the most image-side lens element in the second lens group is preferably a positive meniscus lens element having a convex surface facing toward the image. Further, an aspherical surface is preferably provided on the object-side surface of this meniscus lens element. The aspherical surface is formed so that the radius of curvature becomes smaller than that of the paraxial spherical surface along with an increase of the distance from the optical axis toward the periphery, and thereby positive power of the positive meniscus lens element is weakened; and still further the aspherical surface preferably satisfies the following condition:

$$-5.5 < \Delta X(n-1) \times 1000/f < -2.0 \tag{2}$$

wherein $\Delta X$ designates the amount asphericity with respect to the paraxial spherical surface at a height of 0.3f from the optical axis; and n designates the refractive index of a lens material by which the aspherical surface is formed.

It is noted that the aspherical surface can be formed directly on the lens surface, or can be formed as a hybrid lens element in which a plastic layer is provided on a glass lens element.

The second lens group preferably includes a positive 2a sub lens group, the diaphragm, and a positive 2b sub lens group, in this order from the object. The 2a sub lens group includes a cemented sub lens group having a positive lens element and a negative lens element. The 2b sub lens group includes a negative lens element, a positive lens element, and the positive lens element, in this order from the object. Furthermore, the second lens group preferably satisfies the following conditions:

$$-0.8 < r2a/f < -1.0 \tag{3}$$

$$1.5 < f_{L6}/f_{L5} < 5.0 \tag{4}$$

wherein r2a designates the radius of curvature of the cemented surface of the 2a sub lens group;

$f_{L5}$ designates the focal length of the object-side positive lens element in the 2b sub lens group; and $f_{L6}$ designates the focal length of the image-side positive lens element in the 2b sub lens group.

The present disclosure relates to subject matter contained in Japanese Patent Application No.Hei-11-36100 (filed on Feb. 15, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
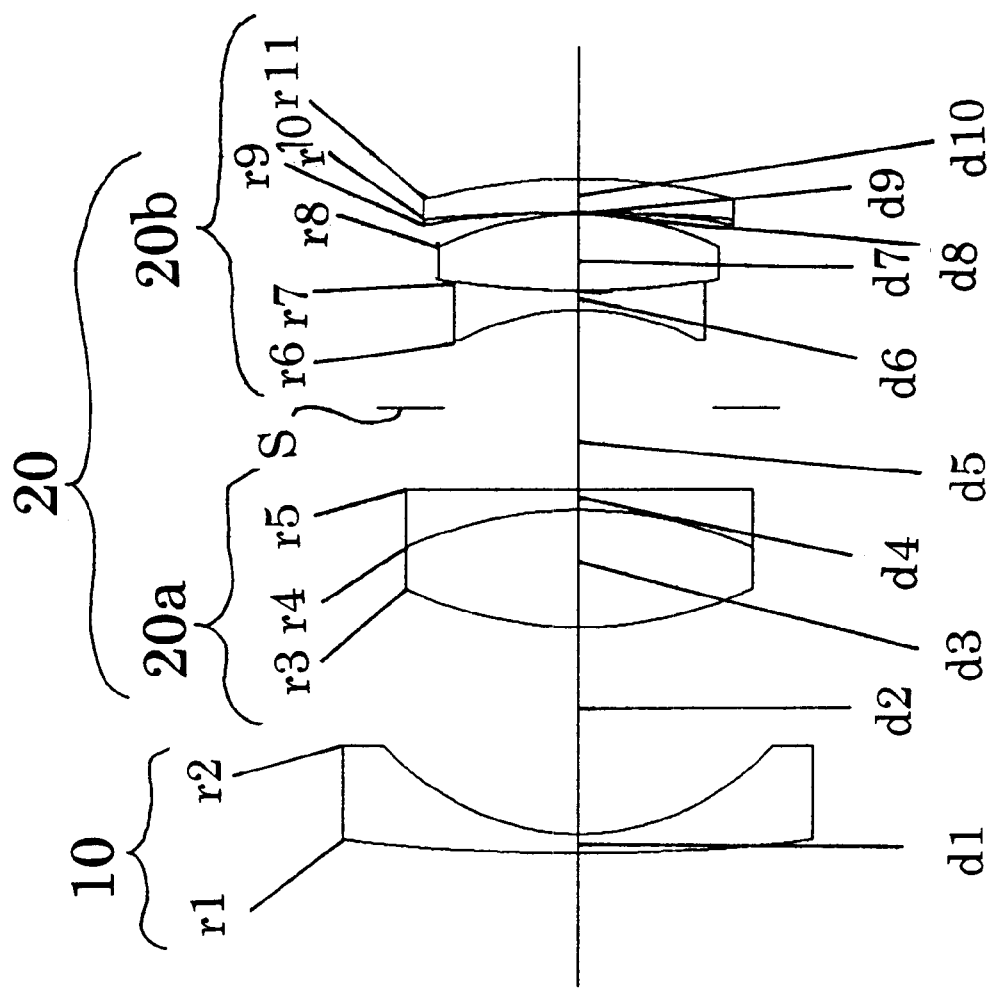
FIG. 1 is a lens arrangement of a first embodiment of a wide-angle lens system, according to the present invention.
Figure 2:
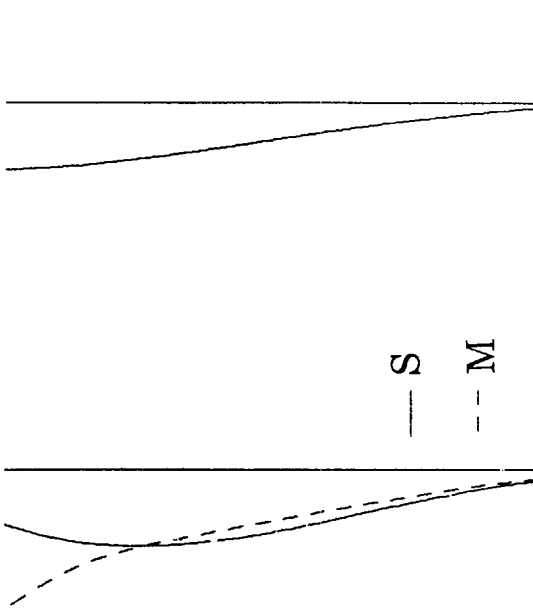
FIGS. 2A, 2B, 2C and 2D are aberration diagrams of the lens arrangement shown in FIG. 1.

The wide-angle lens system, which is discussed in the embodiments shown in FIGS. 1, 3, 5, 7 and 9, includes a negative first lens group 10, and a positive second lens group 20 on which a diaphragm is mounted, in this order from the object. The negative first lens group 10 is constituted by a negative meniscus lens element. The positive second lens group 20 includes a positive 2a sub lens group 20a, a diaphragm S, and a positive 2b sub lens group 20b, in this order from the object. The positive 2a sub lens group 20a includes a cemented sub lens group having a positive lens element and a negative lens element. The positive 2b sub lens group 20b includes a negative lens element, a positive lens element and a positive meniscus lens element, in this order from the object. An aspherical surface is formed on the object-side surface of the positive meniscus lens element which is the most image-side lens element in the positive 2b sub lens group 20b.

Condition (1) specifies the negative power of the first lens group 10. By satisfying this condition, the absolute value of the Petzval sum is reduced, the back focal distance is maintained, and miniaturization can be achieved.

If f1/f exceeds the upper limit of condition (1), the negative power of the first lens group 10 becomes too strong, which may be advantageous to maintain the back focal distance; however, coma and astigmatism occurred in the first lens group 10 cannot be corrected by the second lens group 20.

If f1/f exceeds the lower limit of condition (1), the power of the first lens group 10 becomes too weak, and thereby it becomes difficult to maintain the back focal distance.

Discussions on obtaining higher optical performance will be made. More concretely, a conventional retrofocus wide-angle lens system having a F-number of about 2 will be discussed. In this type of lens system, the field curvature (in particular, DS: the field curvature in the sagittal direction) generally tends to be occurred in the negative direction up to a certain angle of view, and to be occurred in the positive direction at or beyond an intermediate angle of view (a return of DS). Accordingly, in order to maintain the quality of an image plane on the periphery thereof, the field curvature is intentionally made to occur in the negative direction up to an intermediate angle of view. Therefore the Petzval sum is set to have a larger value. In the case where the image plane is curved as explained above, it is necessary to under-correct spherical aberration so that the best image plane position at an intermediate angle of view meets the best image plane position at the center of the image plane. Furthermore, in a conventional retrofocus lens system, aberrations occurred in a negative lens element of the first lens group is arranged to be corrected by the second lens group. However, coma and astigmatic difference are not corrected in a balanced manner, so that coma has to be corrected by the cemented surface of the cemented sub lens group of the second lens group, which results in an increase in astigmatic difference. In other words, DS is more inclined in the negative direction than DM (the field curvature in the meridional direction) is.

In order to eliminate the above problems, the wide-angle lens system described in the embodiments is arranged to make the absolute value of the Petzval sum smaller by increasing the power of the first lens group 10 as defined in condition (1). Subsequently, in order to correct the return of DS, the positive meniscus lens element having a convex surface facing toward the image is provided on the most image-side of the second lens group 20; and further, the aspherical surface is formed on the object-side surface of this positive meniscus lens element. Still further, in order to correct coma and astigmatic difference in a balanced manner, the radius of curvature of the cemented surface of the positive 2a sub lens group 20a is made larger so that the aspherical surface can much more contribute to the correcting of coma. The above described aspherical surface is also arranged to correct spherical aberration and coma in a balanced manner.

It is preferable to increase the power of the object-side positive lens element in the positive 2b sub lens group 20b of the second lens group 20, and to reduce the power of the image-side positive meniscus lens element in the positive 2b sub lens group 20b. It is also preferable to increase the power of the positive 2b sub lens group 20b, or to reduce the power of the positive 2a sub lens group 20a. It is further preferable to reduce the refractive index of the negative lens element in the 2b sub lens group 20b, and to increase the refractive index of the positive lens element thereof.

Condition (2) specifies the amount of asphericity of the positive meniscus lens element positioned on the most image-side in the positive 2b sub lens group 20b of the second lens group 20.

If $\Delta X(n-1) \times 1000/f$ exceeds the upper limit of condition (2), the amount of asphericity becomes smaller, and thereby aberrations occurred in the first lens group 10 cannot sufficiently be corrected.

If $\Delta X(n-1) \times 1000/f$ exceeds the lower limit of condition (2), the amount of asphericity becomes too large, so that the production of the lens element becomes difficult. Further, the Z coefficient is reduced, and thereby centering of the lens element becomes difficult.

Figure 11:
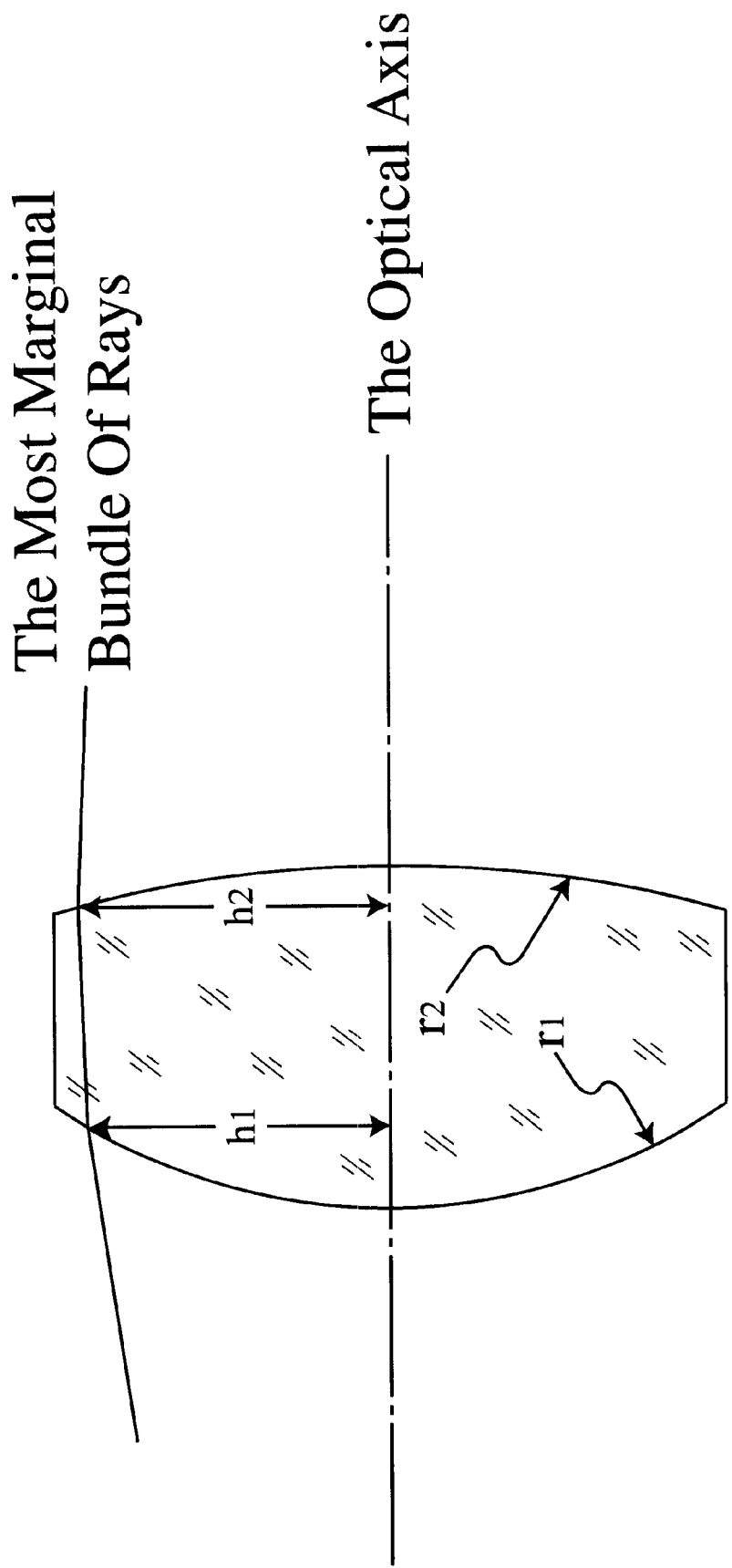
FIG. 11 is an explanatory view for the Z coefficient.

The Z coefficient indicates the degree of easiness for centering a lens element, and is shown by the following equation. The variables therein are shown in FIG. 11.

$$Z=(|h_1/r_1-h_2/r_2|)/2$$

wherein:

$h_1$ designates the effective diameter of the first lens surface;

$h_2$ designates the effective diameter of the second lens surface;

$r_1$ designates the radius of curvature of the first lens surface; and $r_2$ designates the radius of curvature of the second lens surface.

Condition (3) specifies the radius of curvature of the cemented surface of the positive 2a sub lens group 20a. By satisfying this condition, coma and astigmatism (astigmatic difference) can be corrected in a balanced manner.

If r2a/f exceeds the upper limit of condition (3), the radius of curvature of the cemented surface becomes larger. As a result, coma is intensified to the extent that the same cannot be corrected by the aspherical surface formed on the positive meniscus lens element of the 2b sub lens group 20b.

If r2a/f exceeds the lower limit of condition (3), the radius of curvature of the cemented surface becomes smaller. As a result, astigmatism is intensified to the extent that the same cannot be corrected by the aspherical surface.

Condition (4) specifies the power of the two positive lens elements in the 2b sub lens group 20b of the second lens group 20.

If $f_{L6}/f_{L5}$ exceeds the upper limit of condition (4), much power is distributed to the object-side positive lens element, i.e., the power of the object-side positive lens element out of the two positive lens elements becomes too strong. As a result, spherical aberration, and in particular, coma cannot be corrected.

If $f_{L6}/f_{L5}$ exceeds the lower limit of condition (4), much power is distributed to the image-side positive lens element, i.e., the power of the image-side positive lens element out of the two positive lens elements becomes too strong. As a result, the radius of curvature of the aspherical surface formed on the positive meniscus lens element of the 2b sub lens group 20b becomes larger, so that the effect of asphericity is reduced, and thereby it becomes difficult to correct aberrations occurred in the first lens group 10.

Specific numerical data of the embodiments will be described hereinafter. In the diagrams of chromatic aberration represented by spherical aberration, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables, $F_{NO}$ designates the F-number, f designates the focal length of the entire lens system, W designates the half angle-of-view (°), $f_B$ designates the back focal distance, r designates the radius of curvature, d designates the lens thickness or space between lens surfaces, $N_d$ designates the refractive index with respect to the d-line, and v designates the Abbe number.

In addition to the above, an aspherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10}\ldots;$$

wherein:

x designates a distance from a tangent plane of an aspherical vertex;

C designates a curvature of the aspherical vertex (1/r);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIG. 1 is a lens arrangement of the first embodiment of a wide-angle lens system, and FIGS. 2A, 2B, 2C and 2D are aberration diagrams of the lens arrangement shown in FIG. 1. Table 1 shows the numerical data thereof. Lens surface Nos. 1 and 2 represent the negative first lens group 10, lens surface Nos. 3 through 5 represent the positive 2a sub lens group 20a, and lens surface Nos. 6 through 11 represent the positive 2b sub lens group 20b. The diaphragm S is positioned between the 2a and 2b sub lens groups. The aspherical surface provided on the object-side surface of the most image-side positive meniscus lens element in the 2b sub lens group 20b is formed by a synthetic resin layer provided on the glass lens surface.

TABLE 1

| $F_{NO}$ = 1:2.1 | | | |
| f = 35.00 | | | |
| w = 32.2 | | | |
| $f_B$ = 36.90 | | | |
| Surface No. | r | d | Nd | v |
| --- | --- | --- | --- | --- |
| 1 | 143.724 | 1.500 | 1.52310 | 50.8 |
| 2 | 19.146 | 15.649 | — | — |
| 3 | 29.648 | 8.930 | 1.80400 | 46.6 |
| 4 | −30.326 | 1.500 | 1.62364 | 36.5 |
| 5 | 18598.891 | 6.104 | — | — |
| Diaphragm | ∞ | 7.400 | — | — |
| 6 | −18.375 | 1.500 | 1.74000 | 28.3 |
| 7 | 65.666 | 5.770 | 1.77250 | 49.6 |
| 8 | −23.608 | 0.10 | — | — |

TABLE 1-continued

| 9* | −115.530 | 0.100 | 1.51742 | 52.4 |
| --- | --- | --- | --- | --- |
| 10 | −115.530 | 2.548 | 1.77250 | 49.6 |
| 11 | −42.638 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
| --- | --- | --- | --- | --- |
| 9 | 0.00 | $-0.1722 \times 10^{-4}$ | $-0.1832 \times 10^{-7}$ | $-0.7954 \times 10^{-10}$ |

[Embodiment 2]

Figure 3:
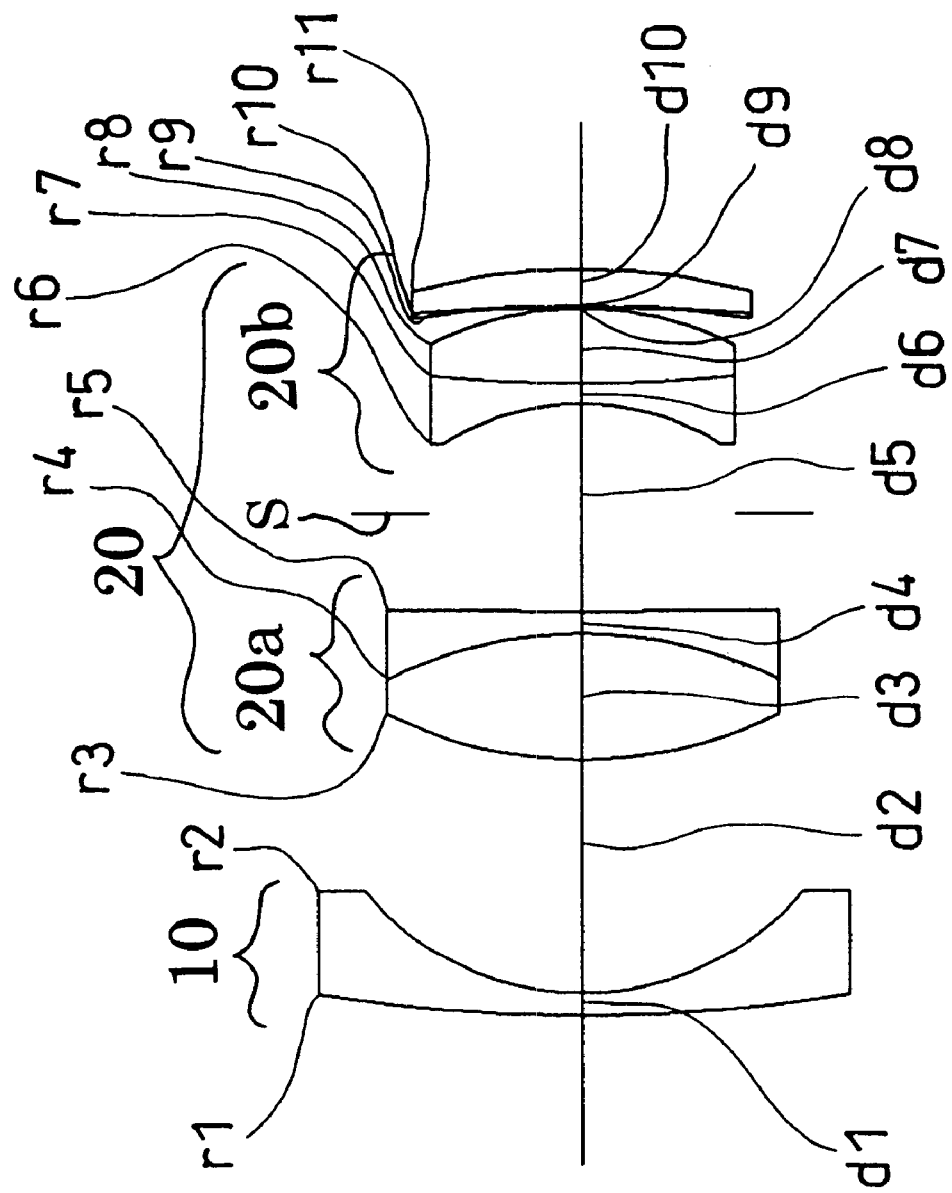
FIG. 3 is a lens arrangement of a second embodiment of the wide-angle lens system, according to the present invention.
Figures 4A, 4B, 4C, 4D:
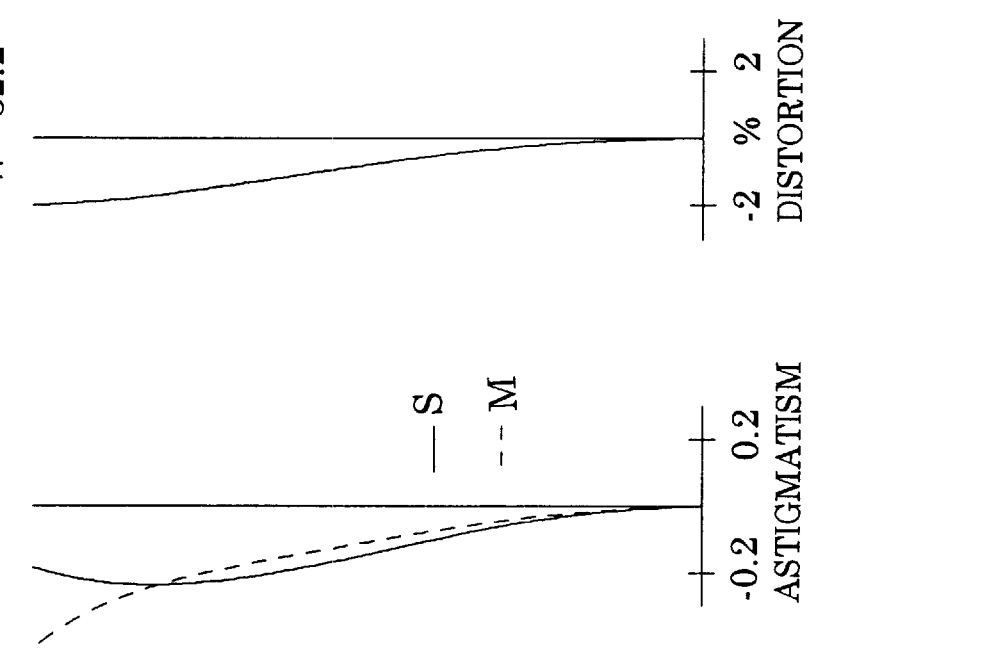
FIGS. 4A, 4B, 4C and 4D are aberration diagrams of the lens arrangement shown in FIG. 3.

FIG. 3 is a lens arrangement of the second embodiment of the wide-angle lens system, and FIGS. 4A, 4B, 4C and 4D are aberration diagrams of the lens arrangement shown in FIG. 3. Table 2 shows the numerical data thereof. Lens surface Nos. 1 and 2 represent the negative first lens group 10, lens surface Nos. 3 through 5 represent the positive 2a sub lens group 20a, and lens surface Nos. 6 through 11 represent the positive 2b sub lens group 20b. The aspherical surface provided on the object-side surface of the most image-side positive meniscus lens element in the 2b sub lens group 20b is formed by a synthetic resin layer provided on the glass lens surface.

TABLE 2

| $F_{NO}$ = 1:2.0 | | | |
| f = 35.00 | | | |
| w = 32.2° | | | |
| $f_B$ = 37.58 | | | |
| Surface No. | r | d | Nd | v |
| --- | --- | --- | --- | --- |
| 1 | 117.241 | 1.500 | 1.51823 | 59.0 |
| 2 | 18.857 | 15.822 | — | — |
| 3 | 29.730 | 8.500 | 1.77250 | 49.6 |
| 4 | −28.916 | 1.500 | 1.59551 | 39.2 |
| 5 | 1117.957 | 6.566 | — | — |
| Diaphragm | ∞ | 7.391 | — | — |
| 6 | −17.377 | 1.500 | 1.72825 | 28.5 |
| 7 | 103.884 | 5.007 | 1.77250 | 49.6 |
| 8 | −21.608 | 0.100 | — | — |
| 9* | −111.801 | 0.100 | 1.51742 | 52.4 |
| 10 | −111.801 | 2.436 | 1.80400 | 46.6 |
| 11 | −44.086 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
| --- | --- | --- | --- | --- |
| 9 | 0.00 | $-0.1695 \times 10^{-4}$ | $-0.1509 \times 10^{-7}$ | $-0.9397 \times 10{-10}$ |

[Embodiment 3]

Figure 5:
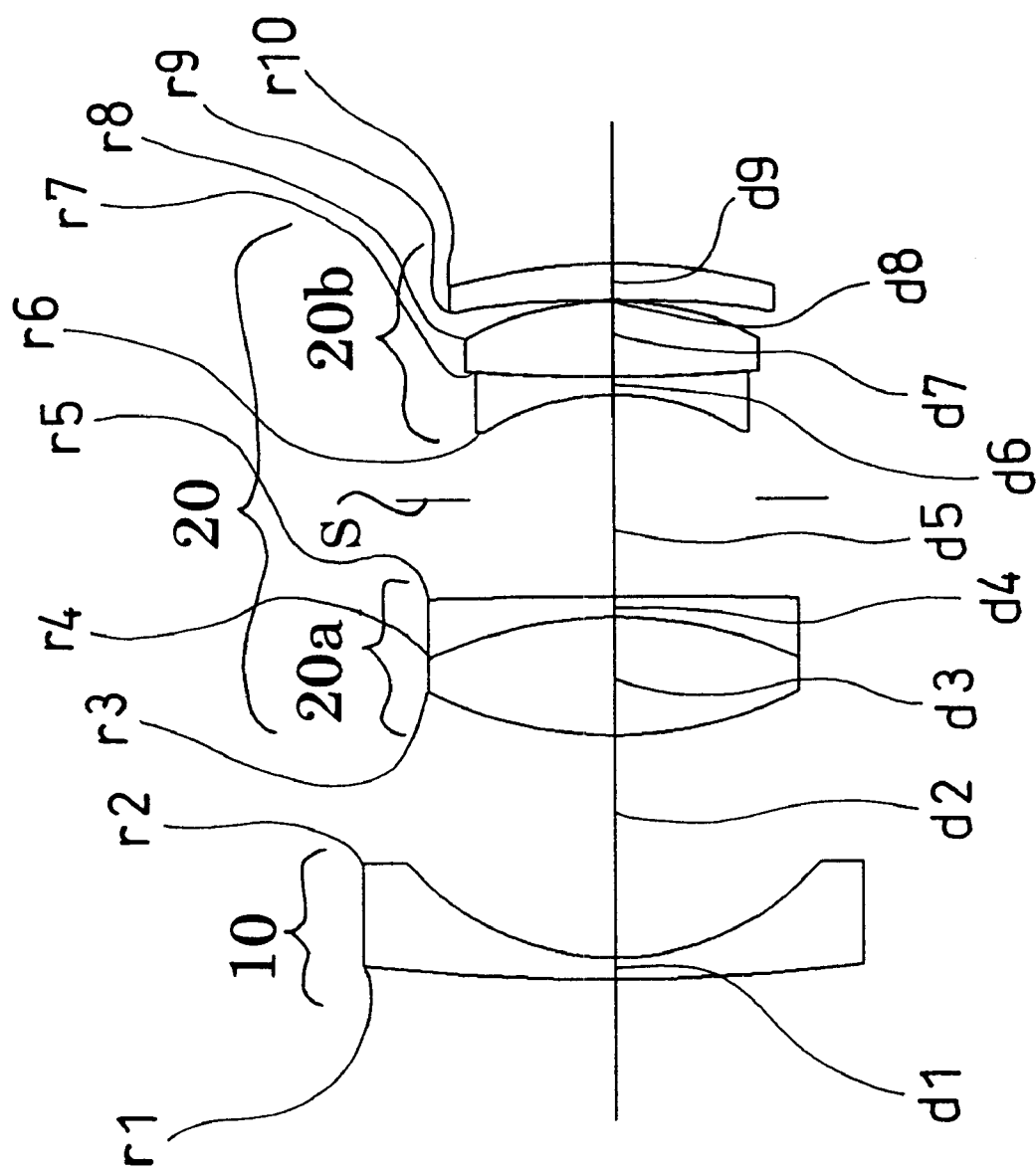
FIG. 5 is a lens arrangement of a third embodiment of the wide-angle lens system, according to the present invention.
Figure 6:
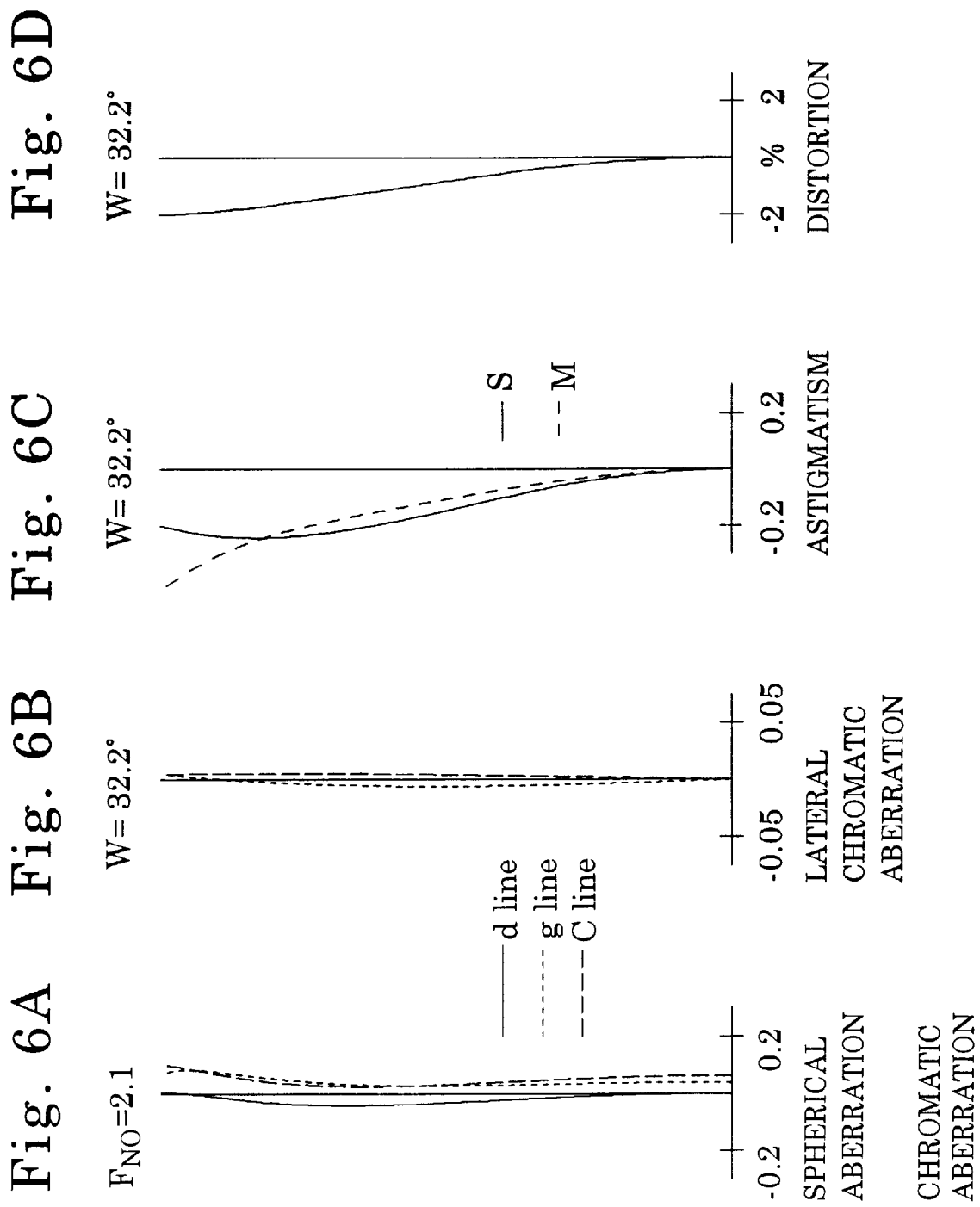
FIGS. 6A, 6B, 6C and 6D are aberration diagrams of the lens arrangement shown in FIG. 5.

FIG. 5 is a lens arrangement of the third embodiment of the wide-angle lens system, and FIGS. 6A, 6B, 6C and 6D are aberration diagrams of the lens arrangement shown in FIG. 5. Table 3 shows the numerical data thereof. Lens surface Nos. 1 and 2 represent the negative first lens group 10, lens surface Nos. 3 through 5 represent the positive 2a sub lens group 20a, and lens surface Nos. 6 through 10 represent the positive 2b sub lens group 20b. The aspherical surface provided on the object-side surface of the most image-side positive meniscus lens element in the 2b sub lens group 20b is directly formed on the glass lens surface.

TABLE 3

$F_{NO} = 1:2.1$
$f = 35.00$
$W = 32.2°$
$f_B = 36.93$

| Surface No. | r | d | Nd | ν |
|---|---|---|---|---|
| 1 | 160.119 | 1.500 | 1.51823 | 59.0 |
| 2 | 19.349 | 15.903 | — | — |
| 3 | 29.120 | 8.500 | 1.77250 | 49.6 |
| 4 | −30.077 | 1.400 | 1.62004 | 36.3 |
| 5 | −664.144 | 6.894 | — | — |
| Diaphragm | ∞ | 7.445 | — | — |
| 6 | −16.979 | 1.300 | 1.72825 | 28.5 |
| 7 | 117.371 | 5.414 | 1.80400 | 46.6 |
| 8 | −21.927 | 0.100 | — | — |
| 9* | −104.566 | 2.614 | 1.66910 | 55.4 |
| 10 | −40.709 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 9 | 0.00 | −0.1395 × 10$^{-4}$ | −0.1366 × 10$^{-7}$ | −0.6421 × 10$^{-10}$ |

[Embodiment 4]

Figure 7:
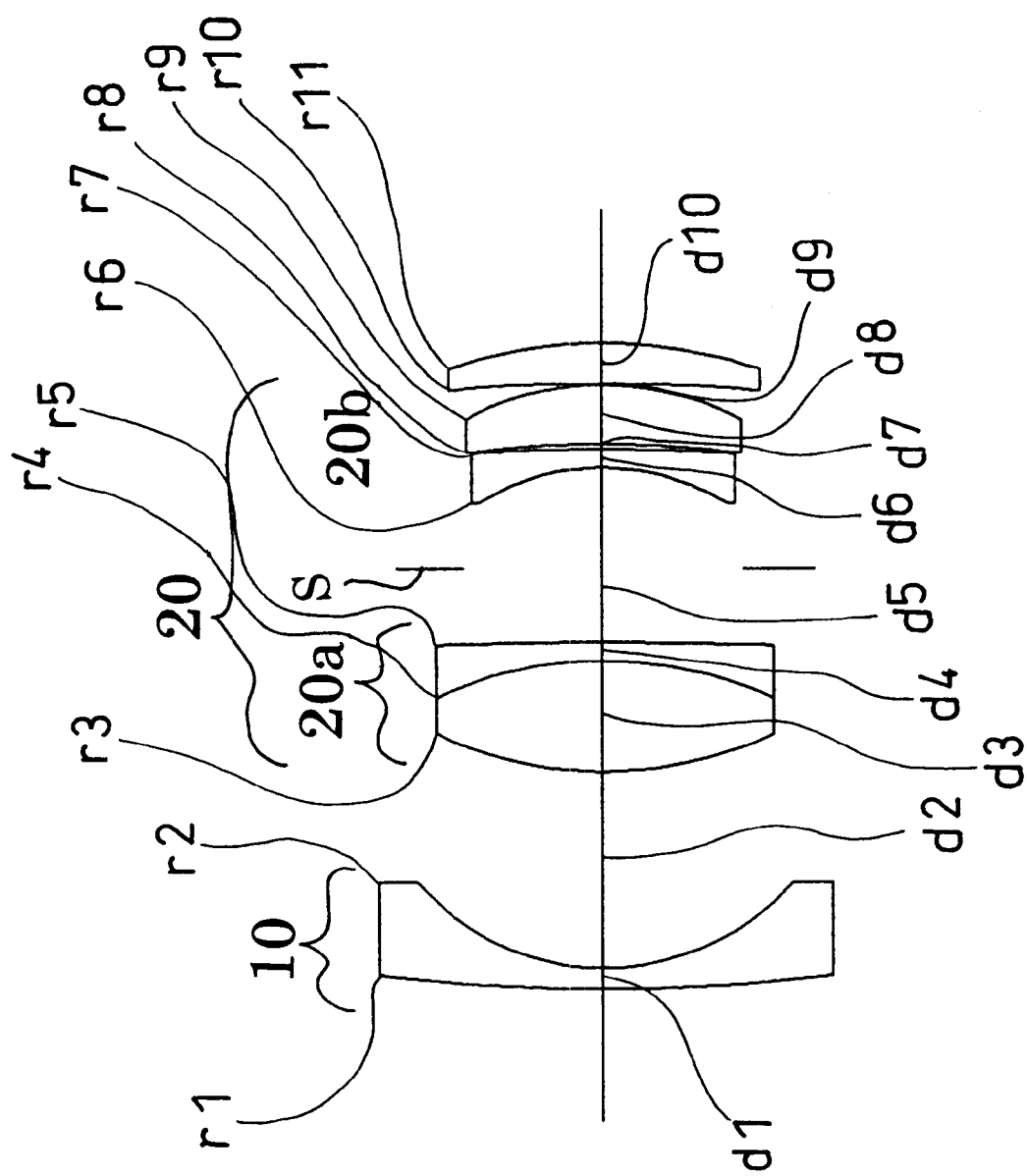
FIG. 7 is a lens arrangement of a fourth embodiment of the wide-angle lens system, according to the present invention.
Figure 8:
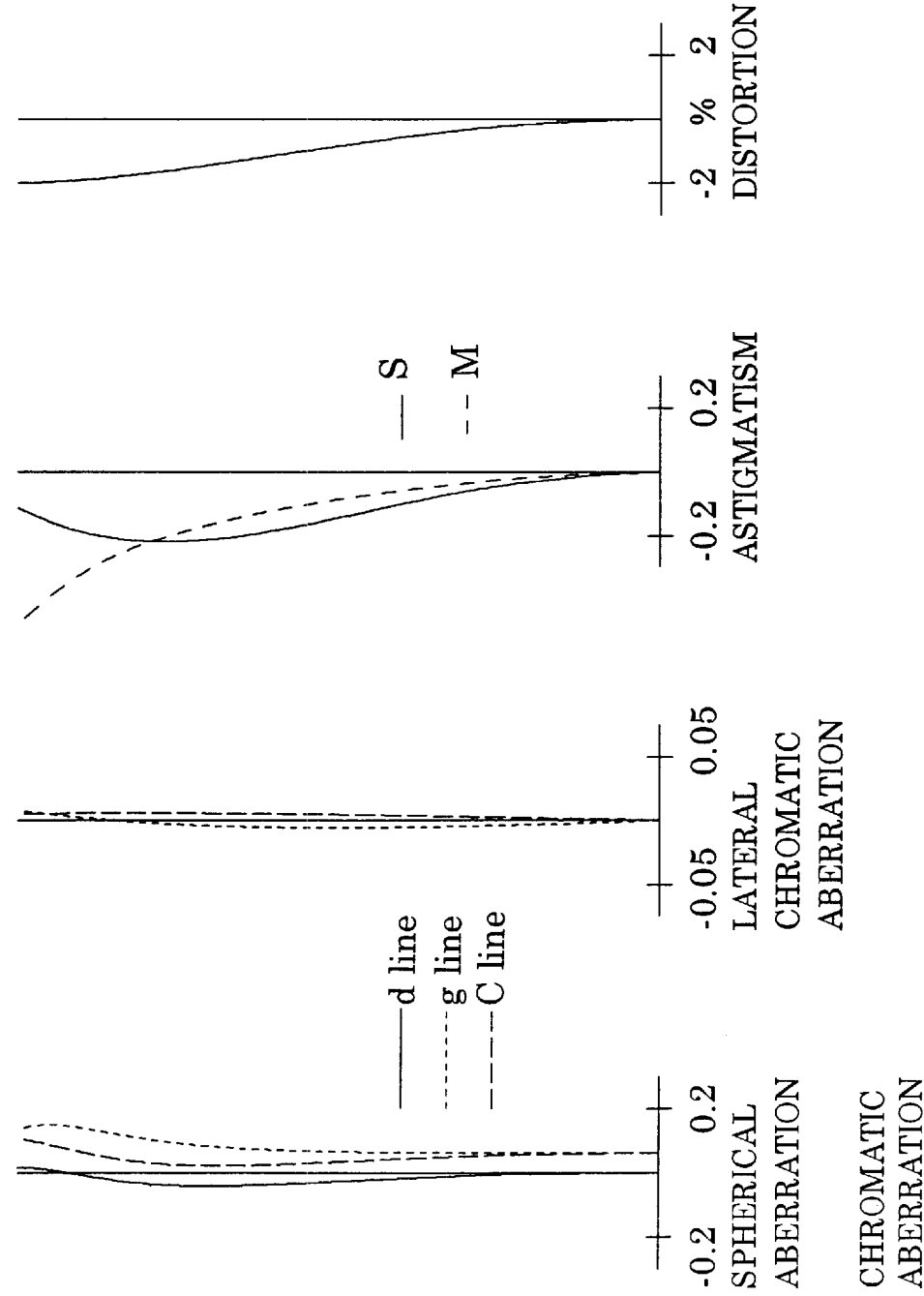
FIGS. 8A, 8B, 8C and 8D are aberration diagrams of the lens arrangement shown in FIG. 7.

FIG. 7 is a lens arrangement of the fourth embodiment of the wide-angle lens system, and FIGS. 8A, 8B, 8C and 8D are aberration diagrams of the lens arrangement shown in FIG. 7. Table 4 shows the numerical data thereof. Lens surface Nos. 1 and 2 represent the negative first lens group 10, lens surface Nos. 3 through 5 represent the positive 2a sub lens group 20a, and lens surface Nos. 6 through 11 represent the positive 2b sub lens group 20b. The aspherical surface provided on the object-side surface of the most image-side positive meniscus lens element in the 2b sub lens group 20b is directly formed on the glass lens surface.

TABLE 4

$F_{NO} = 1:2.0$
$f = 35.00$
$w = 32.2°$
$f_B = 37.93$

| Surface No. | r | d | Nd | ν |
|---|---|---|---|---|
| 1 | 146.963 | 1.500 | 1.51823 | 59.0 |
| 2 | 18.423 | 14.678 | — | — |
| 3 | 28.642 | 8.400 | 1.77250 | 49.6 |
| 4 | −28.642 | 1.400 | 1.60342 | 38.0 |
| 5 | −381.090 | 5.429 | — | — |
| Diaphragm | ∞ | 7.519 | — | — |
| 6 | −17.426 | 1.379 | 1.80518 | 25.4 |
| 7 | −150.390 | 0.418 | — | — |
| 8 | −74.060 | 4.400 | 1.80400 | 46.6 |
| 9 | −21.222 | 0.100 | — | — |
| 10* | −216.808 | 3.100 | 1.66910 | 55.4 |
| 11 | −35.520 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 10 | 0.00 | −0.1172 × 10$^{-4}$ | −0.5051 × 10$^{-8}$ | −0.7061 × 10$^{-10}$ |

[Embodiment 5]

Figure 9:
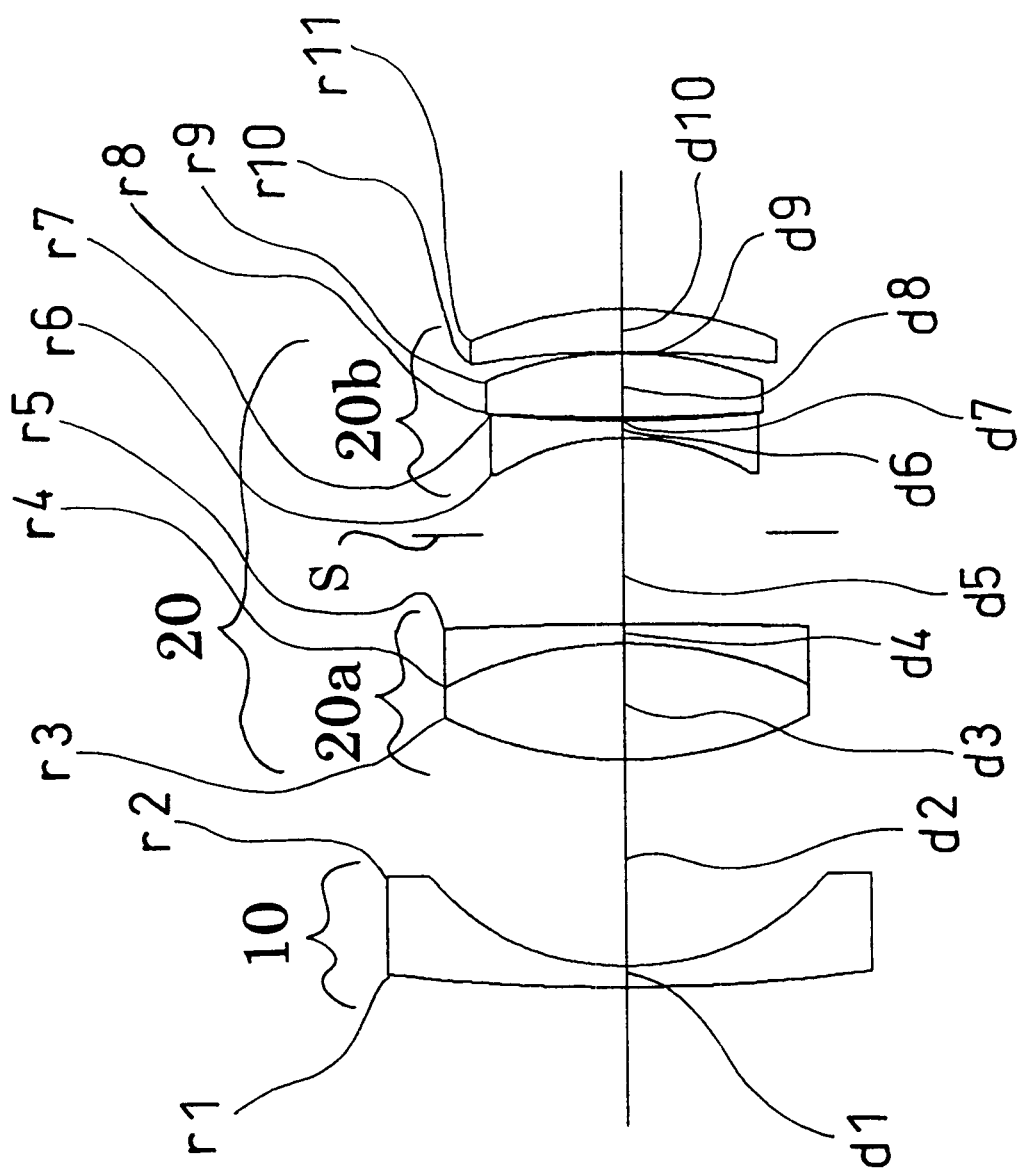
FIG. 9 is lens arrangement of a fifth embodiment of the wide-angle lens system, according to the present invention.
Figure 10:
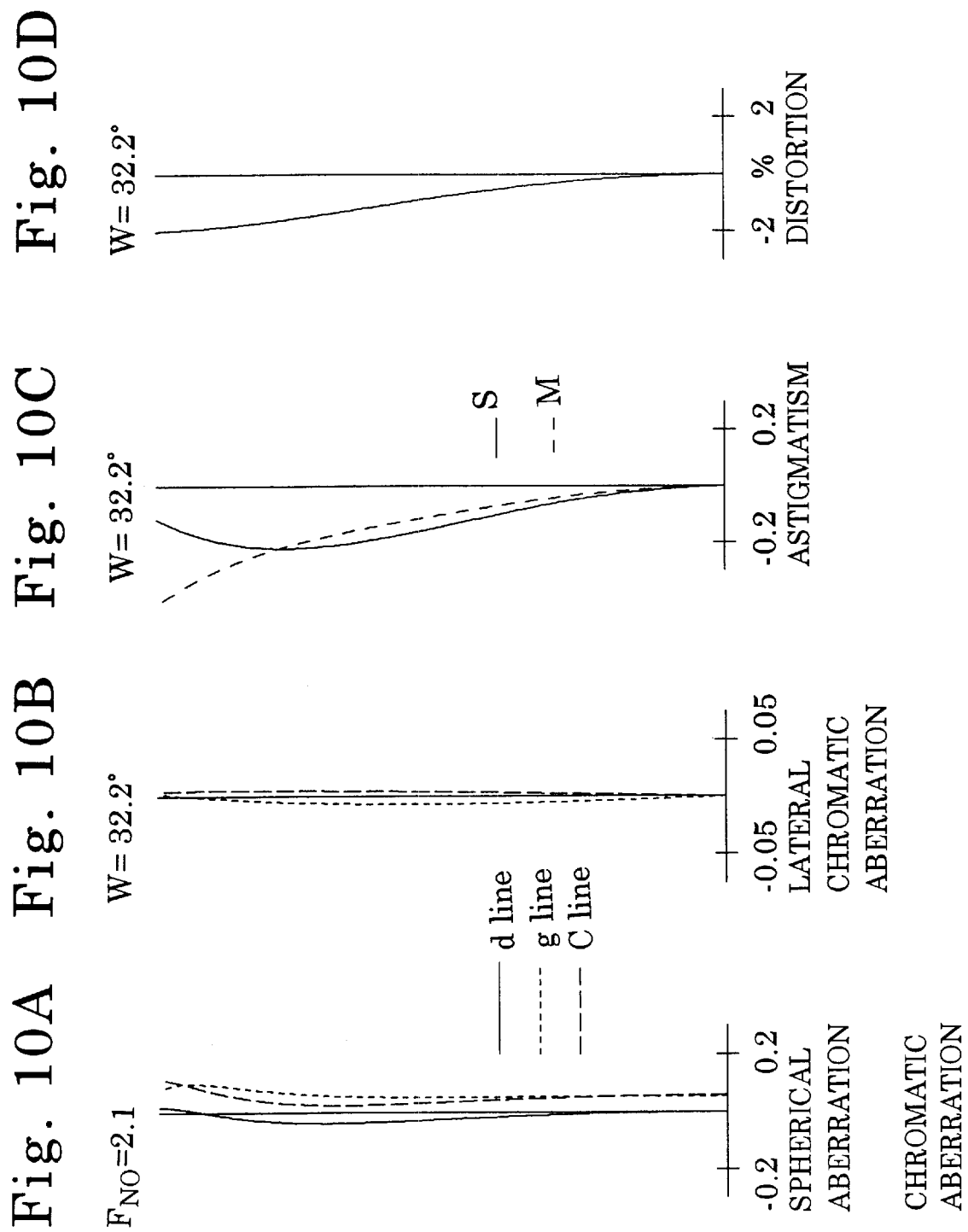
FIGS. 10A, 10B, 10C and 10D are aberration diagrams of the lens arrangement shown in FIG. 9.

FIG. 9 is lens arrangement of the fifth embodiment of the wide-angle lens system, and FIGS. 10A, 10B, 10C and 10D are aberration diagrams of the lens arrangement shown in FIG. 9. Table 5 shows the numerical data thereof. The basic lens arrangement is the same as the fourth embodiment.

TABLE 5

$F_{NO} = 1:2.1$
$f = 35.00$
$w = 32.2°$
$f_B = 37.39$

| Surface No. | r | d | Nd | ν |
|---|---|---|---|---|
| 1 | 150.164 | 1.500 | 1.52249 | 59.8 |
| 2 | 18.754 | 15.084 | — | — |
| 3 | 28.785 | 8.500 | 1.77250 | 49.6 |
| 4 | −28.785 | 1.400 | 1.62004 | 36.3 |
| 5 | −351.552 | 6.436 | — | — |
| Diaphragm | ∞ | 7.022 | — | — |
| 6 | −17.954 | 1.300 | 1.72825 | 28.5 |
| 7 | 89.751 | 0.252 | — | — |
| 8 | 144.336 | 4.626 | 1.80400 | 46.6 |
| 9 | −26.316 | 0.100 | — | — |
| 10* | −85.307 | 3.187 | 1.66910 | 55.4 |
| 11 | −27.790 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 10 | 0.00 | −0.1360 × 10$^{-4}$ | −0.2943 × 10$^{-8}$ | −0.5972 × 10$^{-10}$ |

The numerical values of each condition of each embodiment are shown in Table 6.

TABLE 6

|  | Embod.1 | Embod.2 | Embod.3 | Embod.4 | Embod.5 |
|---|---|---|---|---|---|
| Cond.(1) | −1.21 | −1.25 | −1.22 | −1.17 | −1.18 |
| Cond.(2) | −3.64 | −3.55 | −3.77 | −3.06 | −3.40 |
| Cond.(3) | −0.87 | −0.83 | −0.86 | −0.82 | −0.82 |
| Cond.(4) | 3.72 | 3.22 | 4.21 | 1.77 | 2.15 |

As can be understood from Table 6, each embodiment satisfies each condition. Furthermore, as can be understood from the aberration diagrams, aberrations are adequately corrected.

According to the above description, a miniaturized retrofocus wide-angle lens system in which the half angle of view is about 32° can be obtained.

What is claimed is:
1. A wide-angle lens system that consists of a negative first lens group, and a positive second lens group in this order from an object, said positive lens group comprising a first positive lens sub-group and a second positive lens sub-group;

a diaphragm positioned between said first positive lens sub-group and said second positive lens sub-group;

said wide-angle lens system satisfying the following condition:

$$-1.4 < f1/f < -1.1$$

wherein f1 designates the focal length of said first lens group, and f designates the focal length of the entire lens system.

2. The wide-angle lens system according to claim 1, wherein said second lens group comprises a positive meniscus lens element which is positioned on the image-most side of said second lens group, said positive meniscus lens element having a convex surface facing toward an image;

the object-side surface of said positive meniscus lens element being an aspherical surface;

said aspherical surface has a radius of curvature which becomes smaller than the radius of curvature of the paraxial spherical surface in accordance with an increase in distance from the optical axis toward the periphery; and wherein said aspherical surface satisfies the following condition:

$$-5.5 < \Delta X(n-1) \times 1000/f < -2.0$$

wherein $\Delta X$ designates the amount of asphericity with respect to the paraxial spherical surface at a height of 0.3f from the optical axis; and n designates the refractive index of said aspherical surface.

3. The wide-angle lens system according to claim 1, wherein said second lens group comprises a first positive lens sub-group, said diaphragm, and a second positive lens sub-group, in this order from said object;

wherein said first positive lens sub-group comprises a cemented lens sub-group having a positive lens element and a negative lens element;

wherein said second positive lens sub-group comprises a negative lens element, a positive lens element, and a positive lens, in this order from the object; and wherein said second lens group satisfies the following conditions:

$$-0.8 < r2a/f < -1.0$$

$$1.5 < f_{L6}/f_{L5} < 5.0$$

wherein r2a designates the radius of curvature of said cemented surface of said first positive lens sub-group;

$f_{L5}$ designates the focal length of said object-side positive lens element in said second positive lens sub-group; and $f_{L6}$ designates the focal length of the image-side positive lens in said second positive lens sub-group.

4. A wide-angle lens system comprising a negative first lens group, and a positive second lens group on which a diaphragm is mounted, in this order from an object, said second lens group comprising a positive meniscus lens element positioned on an image-most side of said second lens group, said positive meniscus lens element having a convex surface facing an image on the object-side surface of said positive meniscus lens element being an aspherical surface, said aspherical surface being configured to have a radius of curvature which becomes smaller than a radius of curvature of the paraxial spherical surface in accordance with an increase in distance from the optical axis toward the periphery of the surface;

wherein said wide-angle lens system satisfies the following condition:

$$-1.4 < f1/f < -1.1$$

wherein f1 designates the focal length of said first lens group, and f designates the focal length of the entire lens system, and said aspherical surface satisfies the following condition:

$$-5.5 < \Delta X(n-1) \times 1000/f < -2.0$$

wherein $\Delta X$ designates the amount of asphericity with respect to the paraxial spherical surface at a height of 0.3f from the optical axis; and n designates the refractive index of a lens material of said aspherical surface.

5. A wide-angle lens system comprising a negative first lens group, and a positive second lens group on which a diaphragm is mounted, in this order from an object, said second lens group comprising a first positive lens sub-group, said diaphragm, and a second positive lens sub-group, in this order from said object, said first positive lens sub-group comprising a cemented lens sub-group having a positive lens element and a negative lens element, said second positive lens sub-group comprising a negative lens element, a positive lens element, and a positive lens, in this order from said object;

wherein said wide-angle lens system satisfies the following condition:

$$-1.4 < f1/f < -1.1$$

wherein f1 designates the focal length of said first lens group, and f designates the focal length of the entire lens system, and said second lens group satisfies the following conditions:

$$-0.8 < r2a/f < -1.0$$

$$1.5 < f_{L6}/f_{L5} < 5.0$$

wherein r2a designates the radius of curvature of said cemented surface of said first positive lens sub-group;

$f_{L15}$ designates the focal length of said object-side positive lens element in said second positive lens sub-group; and $f_{L16}$ designates the focal length of the image-side positive lens in said second positive lens sub-group.

6. The wide-angle lens system according to claim 4, said second lens group comprising a first positive lens sub-group, said diaphragm, and a second positive lens sub group in this order from an object.

7. The wide-angle lens system according to claim 6, said first positive lens sub group comprising a cemented lens group having a positive lens element and a negative lens element, said second positive lens sub group comprising a negative lens element, a positive lens element and a positive lens in this order from the object.

8. The wide-angle lens system according to claim 7, said second lens group satisfying the following conditions:

$$-0.8 < r2a/f < -1.0$$

$$1.5 < f_{L6}/f_{L5} < 5.0$$

wherein r2a designates a radius of curvature of said cemented surface of said second positive lens sub-group;

$f_{L5}$ represents the focal length of said object side positive lens element in said second positive lens sub-group; and $f_{L6}$ designates the focal length of the image side positive lens in said second positive lens sub-group.

9. The wide-angle lens system according to claim 5, said second lens group comprising a positive meniscus lens element positioned on an image-most side of said second lens group and having a convex surface facing an image on the object side surface of said positive meniscus lens element being an aspherical surface.

10. The wide-angle lens system according to claim 9, wherein said aspherical surface has a radius of curvature which becomes smaller than a radius of curvature of a paraxial spherical surface in accordance with an increase in the distance from the optical axis towards the periphery of the lens, so that a positive power of said positive meniscus lens is reduced.

11. The wide-angle lens system according to claim 10, said aspherical surface satisfying the following relationship:

$$-5.5 < \Delta X(n-1) \times 1000/f < -2.0$$

wherein $\Delta X$ represents the amount of asphericity with respect to the paraxial spherical surface at a height of 0.3f from the optical axis; and n represents the refractive index of the lens material of said aspherical surface.

12. The wide-angle lens system according to claim 1, said first lens group comprising a simple lens.

13. The wide-angle lens system according to claim 4, said negative first lens group comprising a simple lens.

14. The wide-angle lens system according to claim 5, said negative first lens group comprising a simple lens.

15. The wide-angle lens system according to claim 1, each lens surface of said negative first lens group being a spherical surface.

16. The wide-angle lens system according to claim 4, each lens surface of said negative first lens group being a spherical surface.

17. The wide-angle lens system according to claim 5, each lens surface of said negative first lens group being a spherical surface.

18. A wide-angle lens system comprising a negative first lens group and a positive second lens group, in this order from an object, said second lens group comprising a positive meniscus lens element, an object-side surface of said positive meniscus lens element being an aspherical surface;

wherein said wide-angle lens system satisfies the following condition:

$$-1.4 < f1/f < -1.1$$

wherein f1 designates the focal length of said first lens group, and f designates the focal length of the entire lens system, and said aspherical surface satisfies the following condition:

$$-5.5 < \Delta X(n-1) \times 1000/f < -2.0$$

wherein $\Delta X$ designates the amount of asphericity with respect to the paraxial spherical surface at a height of 0.3f from the optical axis; and n designates the refractive index of a lens material of said aspherical surface.

19. A wide-angle lens system comprising a negative first lens group and a positive second lens group, in this order from an object, said second lens group comprising first positive and second positive lens sub-groups, in this order from said object, said first positive lens sub-group comprising a cemented lens sub-group, said second positive lens sub-group comprising at least two positive lens elements;

wherein said wide-angle lens system satisfies the following condition:

$$-1.4 < f1/f < -1.1$$

wherein f1 designates the focal length of said first lens group, and f designates the focal length of the entire lens system, and said second lens group satisfies the following conditions:

$$-0.8 < r2a/f < -1.0$$

$$1.5 < f_{L6}/f_{L5} < 5.0$$

wherein r2a designates the radius of curvature of said cemented surface of said first positive lens sub-group;

$f_{L15}$ designates the focal length of an object-side positive lens element in said second positive lens sub-group; and $f_{L16}$ designates the focal length of an image-side positive lens element in said second positive lens sub-group.

* * * * *